US008634881B2

(12) United States Patent
Alpert et al.

(10) Patent No.: US 8,634,881 B2
(45) Date of Patent: Jan. 21, 2014

(54) IRREGULAR PERIODIC LOCATION REPORTING MECHANISM

(75) Inventors: Yaron Alpert, Hod HaSharon (IL); Gil Zukerman, Hod-HaSharon (IL)

(73) Assignee: Intel Corporation, Santa Clara, CA (US)

(*) Notice: Subject to any disclaimer, the term of this patent is extended or adjusted under 35 U.S.C. 154(b) by 18 days.

(21) Appl. No.: 13/334,354

(22) Filed: Dec. 22, 2011

(65) Prior Publication Data

US 2013/0165147 A1     Jun. 27, 2013

(51) Int. Cl.
*H04W 88/02* (2009.01)
(52) U.S. Cl.
USPC .................................................. 455/574
(58) Field of Classification Search
USPC ............... 455/574, 456.2, 453.2; 370/311; 343/702; 355/67; 382/260
See application file for complete search history.

(56) References Cited

U.S. PATENT DOCUMENTS

2005/0097179 A1*  5/2005  Orme .......................... 709/207
2008/0162686 A1*  7/2008  Kalaboukis et al. .......... 709/224

* cited by examiner

*Primary Examiner* — Diane Mizrahi
(74) *Attorney, Agent, or Firm* — Forefront IP Lawgroup, PLLC

(57) ABSTRACT

Described herein are techniques related to irregular periodic reporting of location-related information. The techniques enable the location engine to operate in irregular periodic reporting modes and dynamically adapt one or more different irregular periodic reporting patterns. The techniques may advantageously enable significant power saving while maintaining adequate accuracy in the reported location-related information to satisfy a given level of quality of service. This Abstract is submitted with the understanding that it will not be used to interpret or limit the scope or meaning of the claims.

15 Claims, 8 Drawing Sheets

IRREGULAR PERIODIC LOCATION REPORTING MECHANISM

BACKGROUND

The prevalence of mobile devices leads to more and more location-based services that are accessible with mobile devices. Location-based services utilize the geographical position of the mobile devices and include services to identify the location of a person, object or service. The geographical location of a mobile device may be determined by a location engine of the mobile device based on, for example, a global navigation satellite system (GNSS), a Wi-Fi positioning system (WPS) or an inertial navigation system (INS). Location-related information provided by the location engine, is utilized by one or more higher-layer software applications running on the mobile device that render one or more services to a user of the mobile device. As the location of a mobile device carried by a user is expected to change from time to time, there presently exist a few approaches for the location engine to report location-related information to one or more modules and applications of higher layer(s).

One of the approaches is for the location engine to provide location-related information according to a regular periodic reporting pattern. According to the regular periodic reporting pattern, the location engine provides, or reports, the location-related information to a module or application that needs the information periodically. For example, the location engine may provide location-related information with passage of every 1 second of time with updated location-related information. The reporting may be more frequent or less frequent depending on the particular need. In any case, the periodicity based on which the location engine reports the location-related information is set and does not change. Under this approach, the location engine reports the location-related information periodically irrespective of whether the location of the mobile device is changing or whether the application or module that utilizes the location-related information may still render the location-based service to the user with less frequent updates of the location-related information. From a perspective of power conservation, this approach may at times consume power unnecessarily.

Another approach is a one-time, on-request approach in that the location engine does not provide location-related information, unless it is requested by a module or an application to provide the location-related information. In terms of power conservation, this approach may be better than the above-described approach. However, this may be at the expense of accuracy of the provided location-related information. More specifically, as a given amount of time may be required for the location engine to obtain the latest geographical information of the mobile device, the location engine may not have the most up-to-date geographical information at the time when it receives the request for location-related information. For example, when the location engine uses GNSS to determine the geographical location of the mobile device, it takes a duration referred to as the time to first fix for the location engine to acquire satellite signals and navigation data to calculate a location solution. Accordingly, when the mobile device is on the move with its location continuously changing, this approach may be undesirable.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are techniques, architectures, platforms, devices, framework, mechanisms and processes report location-related information according to an irregular periodic reporting pattern. The techniques enable the location engine to operate in irregular periodic reporting modes and dynamically adapt one or more different irregular periodic reporting patterns. The techniques may advantageously enable significant power saving while maintaining adequate accuracy in the reported location-related information to satisfy a given level of quality of service.

The techniques may be implemented as an extension of current location application programming interface (API). An API according to the present disclosure may enable both the operating system and the location engine to determine and negotiate on irregular periodic reporting patterns or the next reporting period. The request for location-related information to be reported on an irregular periodic reporting pattern may be initiated by higher OS, a communication layer (e.g., an application layer), or a lower-layer location engine component (e.g., a location protocol stack). Alternatively, the techniques may be implemented in the API, an application, a location engine, or a combination thereof. Each irregular periodic reporting pattern described herein has non-constant intervals between adjacent instances of reporting of the location-related information.

Example Framework

Figure 1:
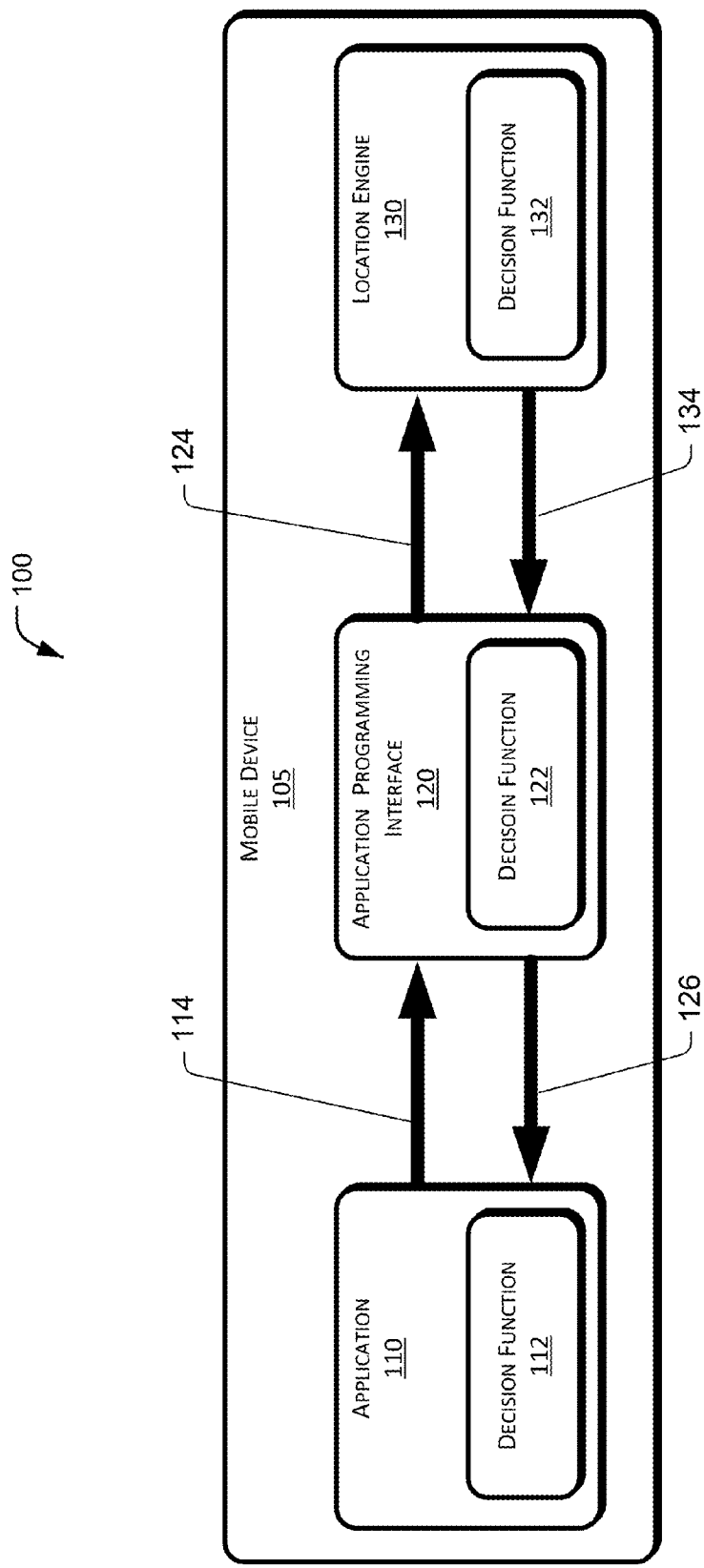
FIG. 1 is a block diagram illustrating an example framework implementing techniques of irregular periodic reporting of location-related information in accordance with the present disclosure.
Figure 2:
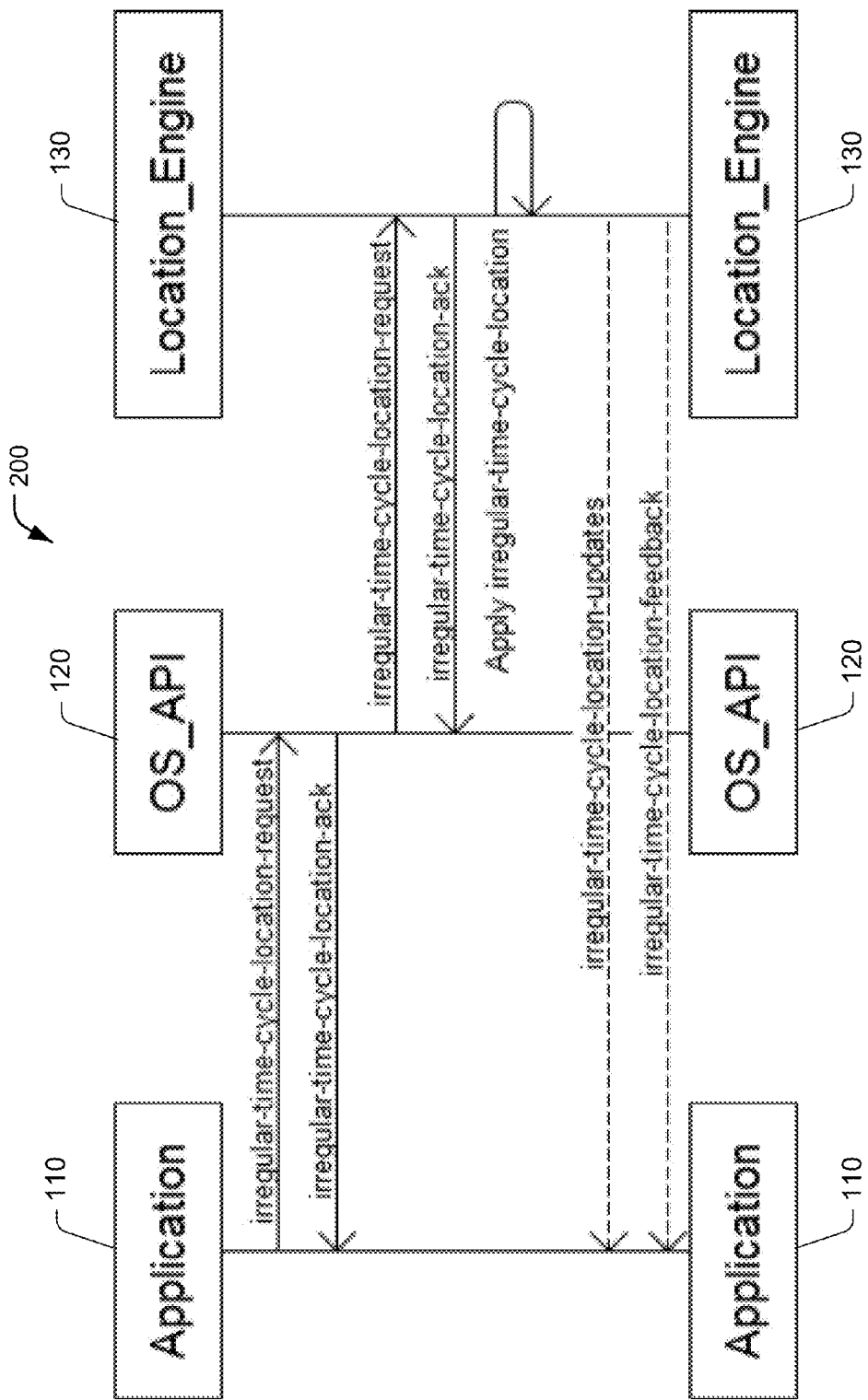
FIG. 2 is a block diagram illustrating an example mechanism implementing techniques of irregular periodic reporting of location-related information in the framework of FIG. 1.

FIG. 1 illustrates an example framework 100 in which the techniques of irregular periodic reporting of location-related information in accordance with the present disclosure are implemented. FIG. 2 illustrates an example mechanism 200 implementing techniques of irregular periodic reporting of location-related information in the framework of FIG. 1.

As shown in FIG. 1, the framework 100 includes an application 110 that includes a decision function module 112, an API 120 that includes a decision function module 122, and a location engine 130 that includes a decision function 132. The application 110, API 120 and location engine 130 may be implemented in a mobile device 105 as shown in FIG. 1. The mobile device 105 is a portable electronic device that may be, for example, a tablet computer, a notebook computer, a laptop computer, a smartphone, a personal navigation device, a personal digital assistant or the like. In some embodiments, functions of the application 110 and/or the API 120 are executed by a central processing unit (CPU) of the mobile device 105 while functions of the location engine 130 is executed by a separate processor, e.g., a GNSS-processing chip. In some embodiments, functions of some or all of the application 110, API 120 and location engine 130 are executed by the CPU or a single processor of the mobile device 105.

The application 110 may be an application that provides location-based services to a user of the mobile device 105 who, in turn, carries the mobile device 105 and the location of which changes from time to time. The decision function 112 of the application 110 is a portion of the application 110 that is capable of making decisions and executing operations with respect to the techniques of the present disclosure, and may be implemented as a set of instructions or code in the application 110 for example. The application 110 may execute one or more operations with respect to the techniques of the present disclosure as directed by the decision function 112.

The API 120 may be an API of the operating system (OS) of the mobile device 105. The API 120 is capable of initiating requests as well as forwarding messages and information between the Application 110 and the location engine 130. The decision function 122 of the API 120 is a portion of the API 120 that is capable of making decisions and executing operations with respect to the techniques of the present disclosure, and may be implemented as a set of instructions or code in the API 120 for example. The API 120 may execute one or more operations with respect to the techniques of the present disclosure as directed by the decision function 122.

The location engine 130 may be implemented in the form of software, firmware, hardware or a combination thereof. The location engine 130 may utilize the GNSS, WPS, INS, one or more other navigation software, firmware or hardware components, or a combination thereof to determine geographical location of the mobile device 105 and provide location-related information to the API 120 and the application 110. The one or more other navigation software, firmware or hardware components of the location engine 130 may include, for example, an accelerometer, a gyroscope, a magnetometer, or a combination thereof. The decision function 32 of the location engine 130 is a portion of the location engine 130 that is capable of making decisions and executing operations with respect to the techniques of the present disclosure, and may be implemented as a set of instructions or code in the location engine 130 for example. The location engine 130 may execute one or more operations with respect to the techniques of the present disclosure as directed by the decision function 132. The location-related information provided by the location engine 130 may include longitude and latitude of the mobile device 105, a relative distance between the mobile device 105 and one or more other mobile devices, geographical locations, facilities and/or services, or a combination thereof.

In one example scenario, the API 120 may determine, based on one or more factors including user input and status of the mobile device 105, that the location engine 130 needs to provide location-related information on an irregular periodic reporting pattern. The API 120 may send a request 124 that requests the location-related information be provided according to an irregular periodic reporting pattern. In response, the API 120 may receive a response 134 that includes the location-related information according to the irregular periodic reporting pattern or, alternatively, a request from the location engine 130 to provide the location-related information according to another irregular periodic reporting pattern as will be described below.

In another example scenario, the application 110 may determine, based on one or more factors including user input and status of the mobile device 105, that the location engine 130 needs to provide location-related information on an irregular periodic reporting pattern. The application 110 may send a request 114 that requests the location-related information be provided according to an irregular periodic reporting pattern. In response, the application 110 may receive a response 126 that includes the location-related information according to the irregular periodic reporting pattern or, alternatively, a request from the location engine 130 to provide the location-related information according to another irregular periodic reporting pattern as will be described below. The API 120 may forward the request 114 received from the application 110 to the location engine 130, and forward the response 126 received from the location engine 130 to the application 110.

As shown in FIG. 2, the application 110 sends a request to receive location-related information according to a given irregular periodic reporting pattern, e.g., non-periodic time cycles. Upon receiving the request, the API 120 sends an acknowledgement to the application 110 and forwards the request to the location engine 130. In response to receiving the request, the location engine 130 sends an acknowledgement. In some cases, the engine location 130 may apply the irregular periodic reporting pattern and provide updates on the location-related information according to the irregular periodic reporting pattern. In other cases, the location engine 130 may send feedback to the application 110 or to the API 120. The feedback may include a request to provide the location-related information according to another irregular periodic reporting pattern different from the one originally requested.

Example Implementation Scheme

Figure 3:
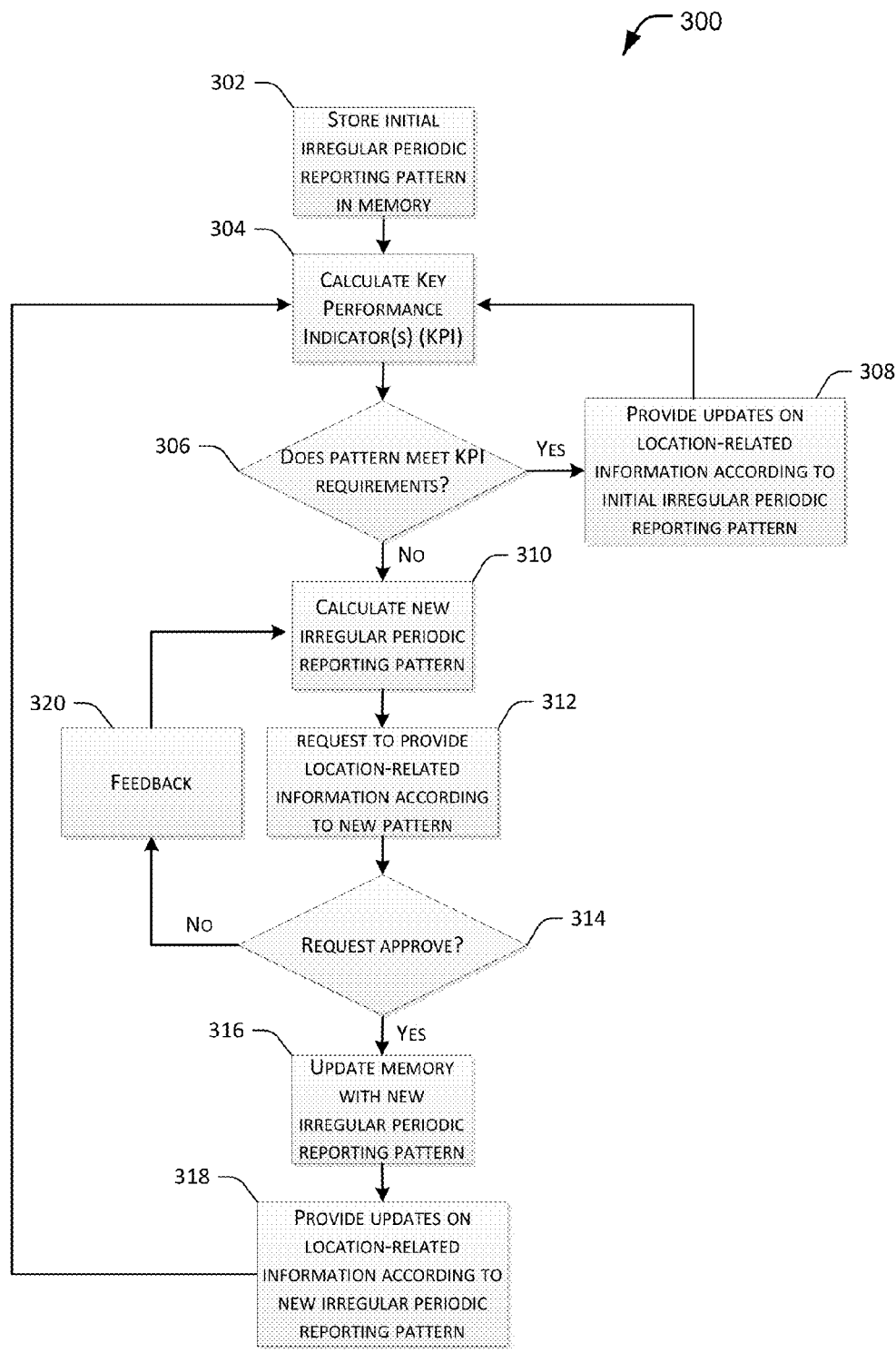
FIG. 3 is a flow chart illustrating an implementation scheme of irregular periodic reporting of location-related information in accordance with the present disclosure.

FIG. 3 illustrates an implementation scheme 300 of irregular periodic reporting of location-related information in accordance with the present disclosure. While the API 120 carries out some operations in the scheme 300, the application 110 or the location engine 130, or both, carry out other operations in the scheme 300.

At operation 302, an initial irregular periodic reporting pattern is stored in memory. For example, the initial irregular periodic reporting pattern may be previously negotiated between the location engine 130 and the API 120 or the application 110. Alternatively, the initial irregular periodic reporting pattern may be calculated by the location engine 130, the API 120, or the application 110. The initial irregular periodic reporting pattern is stored in respective memory by the location engine 130, the API 120 and/or the application 110.

At operation 304, one or more key performance indicators (KPIs) are calculated. For example, the one or more KPIs may include power consumption, accuracy, time to first fix, or a combination thereof KPIs are also referred to as performance requirements herein.

At operation 306, it is determined whether the one or more KPIs will be met if the initial irregular periodic reporting pattern is applied. For example, the API 120 or the location engine 130 may perform computation to determine whether power consumption may be excessive, whether accuracy of the location-related information may be lower than a threshold level, or whether the time to first fix may be too long if the initial irregular periodic reporting pattern is applied.

At operation 308, in an event that it is determined that the one or more KPIs will still be met when the initial irregular periodic reporting pattern is applied, the location engine 130 applies the pattern and provides updates on the location-related information to the API 120 and/or the application 110. The location-related information may include, for example, longitude and latitude and/or relative distance wither respect to the mobile device 105.

At operation 310, in an event that it is determined that the one or more KPIs will not be met when the initial irregular periodic reporting pattern is applied, a new irregular periodic reporting pattern is calculated. For example, the location engine 130 or the API 120 may calculate the new irregular periodic reporting pattern.

At operation 312, a request is sent to request to provide the location-related information according to the new irregular periodic reporting pattern. For example, the location engine 130 may send the request to the API 120 and, optionally, the API 120 may forward the request to the application 110. Alternatively, the request may be sent by the API 120 to the application 110.

At operation 314, it is determined whether the request is to be approved. For example, the API 120 may make such determination or, alternatively, the application 110 may make such determination.

At operation 316, in an event that the request is approved, the memory is updated to store the new irregular periodic reporting pattern. For example, the location engine 130, the API 120 and/or the application 110 may store the new irregular periodic reporting pattern in its respective memory to replace the initial irregular periodic reporting pattern. An acknowledgement may be sent by the API 120 or the application 110 to the location engine 130 to acknowledge the approval of the new irregular periodic reporting pattern.

At operation 318, updates on the location-related information are provided according to the new irregular periodic reporting pattern. For example, the location engine 130 may send the updates on the location-related information to the API 120 and/or the application 110 according to the new irregular periodic reporting pattern.

At operation 320, in an event that the request is not approved, a feedback is provided. For example, the API 120 or the application 110 may evaluate one or more factors, such as user input or status of the mobile device 105 for example, and determine not to approve the request. The API 120 or the application 110 may calculate a different irregular periodic reporting pattern and send it as the feedback to the location engine 130. Alternatively or additionally, the API 120 or the application 110 may determine one or more new KPIs, e.g., new power consumption requirement, new accuracy catering to a new level of quality of service, new time to first fix, etc., and the feedback includes the one or more new KPIs.

At this point, the operation 310 is repeated. More specifically, upon receiving the feedback, the location engine 130 or the API 120 may calculate a different irregular periodic reporting pattern according to the one or more new KPIs when the feedback includes the one or more new KPIs. If the feedback includes the different irregular periodic reporting pattern, the scheme may proceed to operations 316 and 318.

Example Processes

FIGS. 4, 5, 6 and 7 illustrate example processes 400, 500, 600 and 700 that implement at least part of the techniques described herein for irregular periodic reporting of location-related information in accordance with the present disclosure. The order in which the process operations of example processes 400, 500, 600 and 700 is described is not intended to be construed as a limitation, and any number of the described process operations may be combined in any order to implement the process, or alternate process. Additionally, individual operations may be deleted from the process without departing from the spirit and scope of the subject matter described herein. Furthermore, the process may be implemented in any suitable hardware, software, firmware, or a combination thereof, without departing from the scope of the present disclosure.

Figure 4:
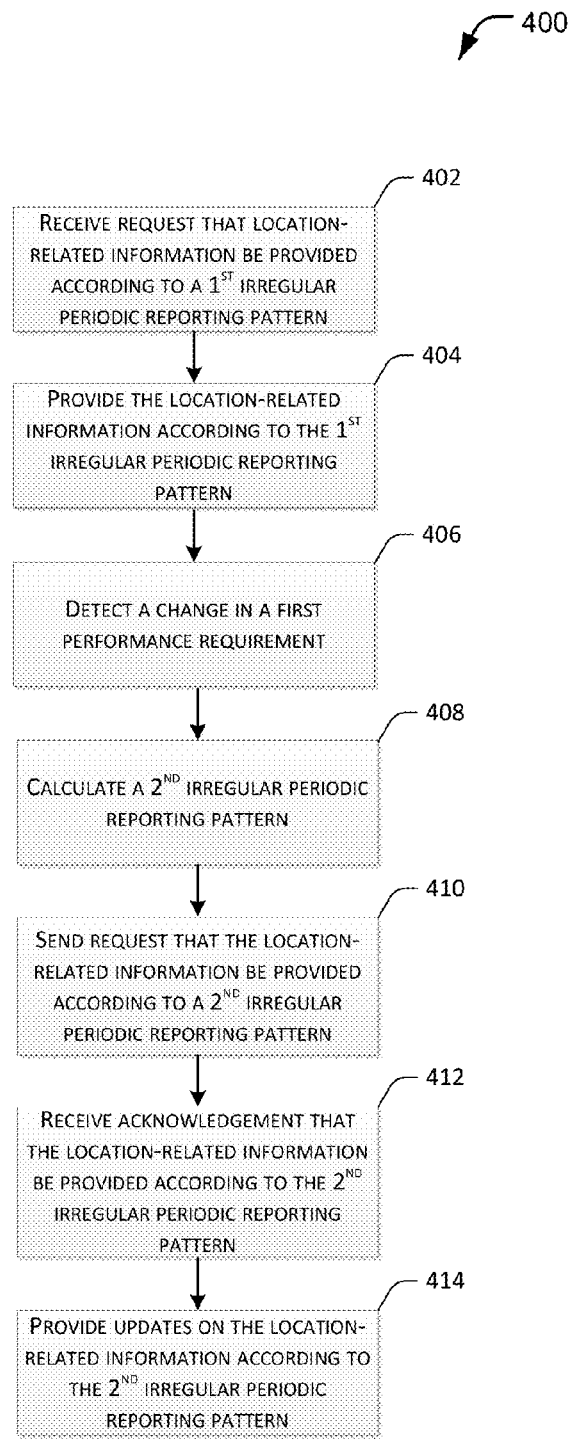
FIG. 4 is a flow chart illustrating an example method of irregular periodic reporting of location-related information in accordance with the present disclosure.

FIG. 4 illustrates the example process 400 for irregular periodic reporting of location-related information. The process 400 is performed, at least in part, by the API 120 or the location engine 130, or partially by the API 120 and partially by the location engine 130.

The process 400 begins with operation 402, where a first request that location-related information be provided according to a first irregular periodic reporting pattern is received. The first irregular periodic reporting pattern includes non-constant intervals between adjacent instances of reporting of location-related information. For example, the location engine 130 or the API 120 may receive such a request from the application 110.

At operation 404, in response to receiving the first request, updates on the location-related information are provided according to the first irregular periodic reporting pattern. For example, the location engine 130 may confirm the request and start providing updates on the location-related information according to the first pattern.

At operation 406, it is detected that there is a change in a first performance requirement. For example, as the location engine 130 provides the updates according to the first pattern, one or more KPIs, or performance may change and such change may be detected by the location engine 130.

At operation 408, a second irregular periodic reporting pattern is calculated. For example, update detecting the change in one or more KPIs, the location engine 130 may calculate the second pattern.

At operation 410, a request that location-related information be provided according to the second irregular periodic reporting pattern is sent. For example, the location engine 130 may send the request to the API 120 or the application 110 to request to provide updates on the location-related information according to the second pattern and not the first pattern.

At operation 412, an acknowledgement that the location-based information is to be provided according to the second irregular periodic reporting pattern is received. For example, upon approval of the request from the location engine 130, the API 120 or the application 110 may send an acknowledgement, and the location engine 130 receives the acknowledge.

At operation 414, updates on the location-based information are provided according to the second irregular periodic reporting pattern in response to receiving the acknowledgement. For example, in response to receiving the acknowledgement, the location engine 130 may send updates on the location-related information according to the second pattern.

In some embodiments, the process 400 may further determine whether a first performance requirement will be met when providing the location-related information according to the first irregular periodic reporting pattern. In an event that it is determined the first performance requirement will be met, updates on the location-related information are provided according to the first irregular periodic reporting pattern. In an event that it is determined the first performance requirement will not be met, the second request is sent. For example, upon receiving the request that location-related information be provided according to the first pattern, the location engine 130 may determine whether to apply the first pattern depending on whether one or more KPIs will be met. The first performance requirement may include, for example, power consumption, accuracy, time to first fix, or a combination thereof. The first performance requirement may be determined by the location engine 130 or, alternatively, may be provided previously by the API 120 or application 110 and accepted by the location engine 130. If the location engine 130 sends a request to propose providing updates on location-related information according to the second pattern, the location engine 130 may calculate the second pattern before sending the request.

Figure 5:
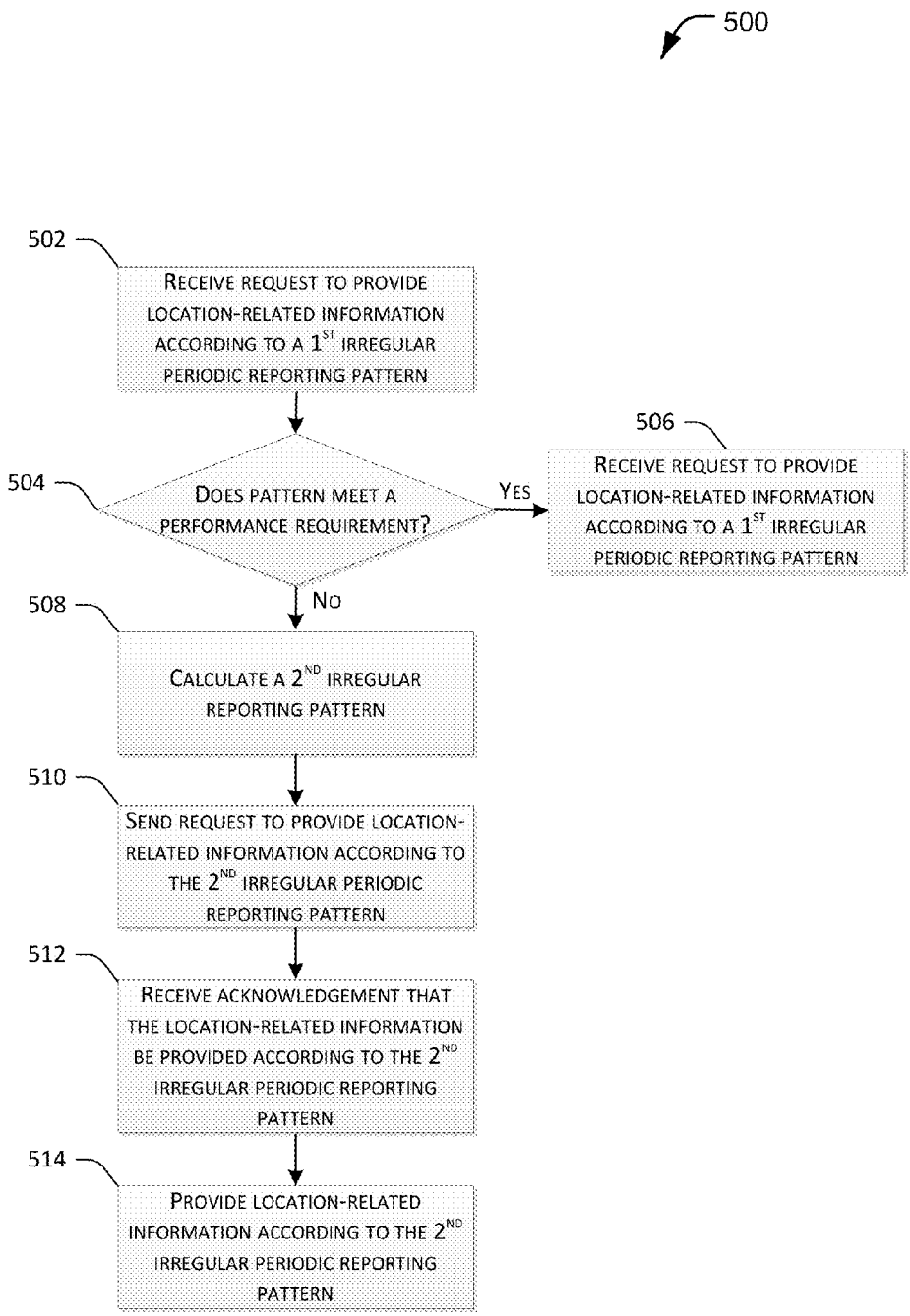
FIG. 5 is a flow chart illustrating another example method of irregular periodic reporting of location-related information in accordance with the present disclosure.

FIG. 5 illustrates the example process 500 for irregular periodic reporting of location-related information. The process 500 is performed, at least in part, by the API 120 or the location engine 130, or partially by the API 120 and partially by the location engine 130.

The process 500 begins with operation 502, where a first request that location-related information be provided according to a first irregular periodic reporting pattern is received. For example, the location engine 130 or the API 120 may receive such request from the application 110.

At operation 504, it is determined whether a first performance requirement will be met when providing the location-related information according to the first irregular periodic reporting pattern. For example, the location engine 130 or the API 120 may make such determination. The first performance requirement may include one or more KPIs such as, for example, power consumption, accuracy, time to first fix, or a combination thereof. The first performance requirement may be determined by the location engine 130 or, alternatively, may be provided previously by the API 120 or application 110 and accepted by the location engine 130.

At operation 506, in an event that it is determined the first performance requirement will be met, updates on the location-related information according to the first irregular periodic reporting pattern are provided. For example, upon determining that the first performance requirement will be met, the location engine 130 may provide the updates according to the first pattern.

At operation 508, in an event that it is determined the first performance requirement will not be met, a second irregular periodic reporting pattern that is different from the first irregular periodic reporting pattern is determined. For example, the location engine 130 or the API 120 may calculate the second pattern when it determines that the first performance requirement will not be met, e.g., power consumption may be too high or accuracy in the location-related information may be too low.

At operation 510, a second request that the location-based information be provided according to the second irregular periodic reporting pattern is sent. For example, the location engine 130 or the API 120 may send the second request to the application 110. Alternatively, the location engine 130 may send the second request to the API 120.

At operation 512, an acknowledgement that the location-based information is to be provided according to the second irregular periodic reporting pattern is received. For example, the location engine 130 or the API 120 may receive the acknowledgement from the application 110. Alternatively, the API 120 may approve the request and send the acknowledgement to the location engine 130.

At operation 514, updates on the location-based information are provided according to the second irregular periodic reporting pattern in response to receiving the acknowledgement. For example, upon receiving the acknowledgement, whether from the API 120 or the application 110, the location engine 130 provides updates on the location-related information according to the second pattern.

In some embodiments, the process 500 may further determine a second performance requirement based on the second irregular periodic reporting pattern, where the second performance requirement is different from the first performance requirement. For example, the location engine 130 may determine the second performance requirement (e.g., one or more new KPIs) and calculate the second pattern based on the second performance requirement.

In some embodiments, the process 500 may further include the following operations: receiving a third request that the location-based information not be provided according to the second irregular periodic reporting pattern; in response to receiving the third request, calculating a third irregular periodic reporting pattern that is different from the first and second irregular periodic reporting patterns; and sending a fourth request to provide the location-based information according to the third irregular periodic reporting pattern. For example, the location engine 130 may receive the third request from the API 120 or the application 110, and calculates the third pattern and send the fourth request to the API 120 or the application 110 requesting to provide updates on the location-related information according to the third pattern. In some embodiments, the third request includes a third performance requirement that is different from the first performance requirement. In such case, the third irregular periodic reporting pattern may be calculated based on the third performance requirement. In some embodiments, the third request may indicate the third pattern, as such the location engine 130 would not need to calculate the third pattern and may start providing updates on the location-related information according to the third pattern.

Figure 6:
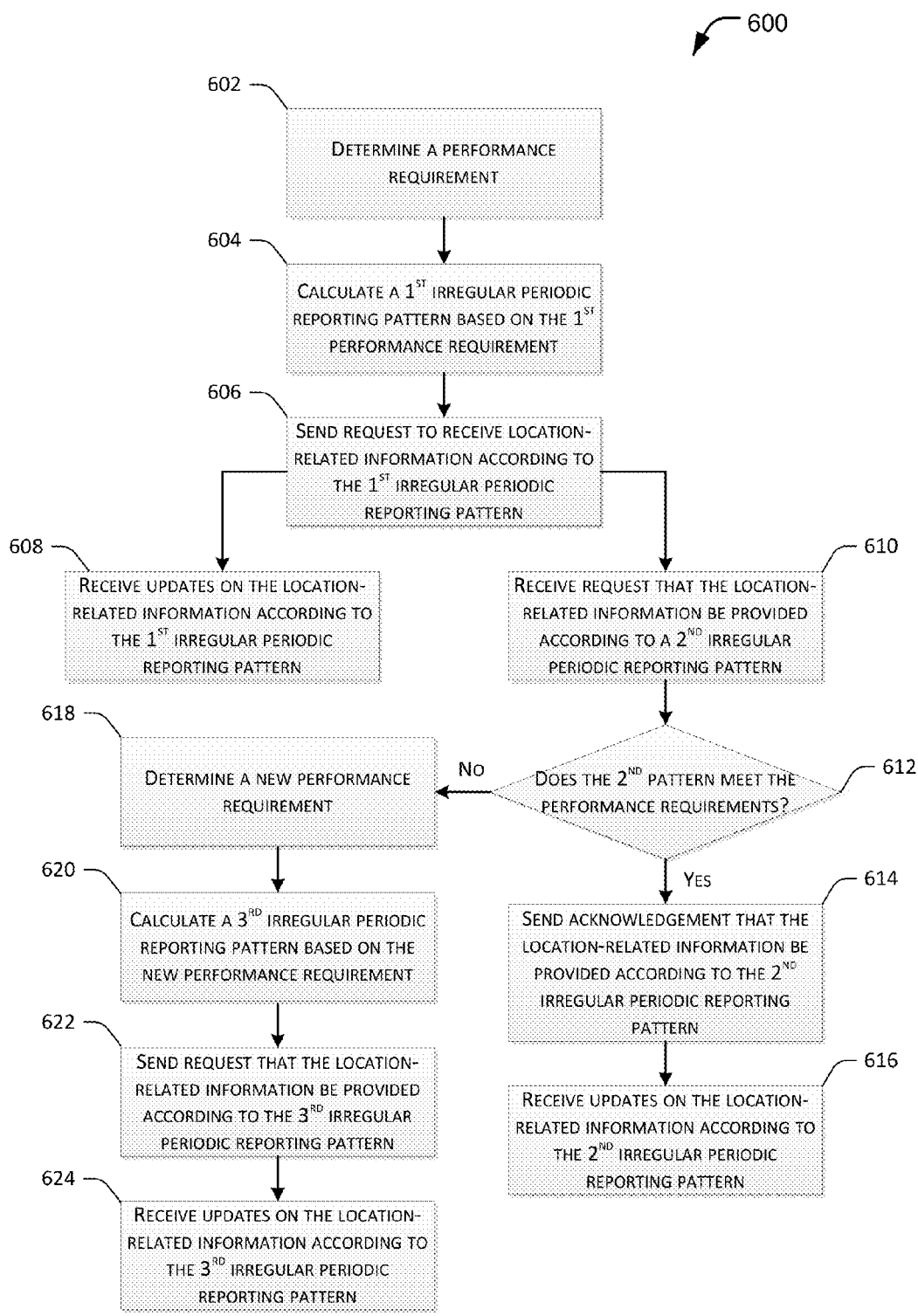
FIG. 6 is a flow chart illustrating yet another example method of irregular periodic reporting of location-related information in accordance with the present disclosure.

FIG. 6 illustrates the example process 600 for irregular periodic reporting of location-related information. The process 600 is performed, at least in part, by the API 120 or the application 110, or partially by the API 120 and partially by the application 110.

The process 600 begins with operation 602, where the API 120 or the application 110 determines a first performance requirement, which may be related to, for example, power consumption, accuracy, time to first fix, or a combination thereof. At operation 604, the API 120 or the application 110 calculates a first irregular periodic reporting pattern based on the first performance requirement. At operation 606, the API 120 or the application 110 sends a first request, e.g., to the location engine 130, requesting to receive the location-related information according to the first irregular periodic reporting pattern. At operation 608, the API 120 or the application 110 receives updates on the location-based information, e.g., from the location engine 130, according to the first irregular periodic reporting pattern. Alternatively, at operation 610, the API 120 or the application 110 the API 120 or the application 110 receives a second request, e.g., from the location engine 130, that the location-based information be provided according to a second irregular periodic reporting pattern.

At operation 612, the API 120 or the application 110 determines whether the first performance requirement, or a second performance requirement that is different from the first performance requirement, will be met when the location-related information is received from the location engine 130 according to the second irregular periodic reporting pattern.

At operation 614, in an event that it is determined the first or second performance requirement will be met, the API 120 or the application 110 sends an acknowledgement to the location engine 130. In response, at operation 616, the API 120 or the application 110 receives, from the location engine 130, updates on the location-based information according to the second irregular periodic reporting pattern.

At operation 618, in an event that it is determined the first or second performance requirement will not be met, the API 120 or the application 110 calculates a third performance requirement that is different from the first and second performance requirements. At operation 620, the API 120 or the application 110 calculates a third irregular periodic reporting pattern that is different from the first and second patterns. The third irregular periodic reporting pattern may be calculated based on the third performance requirement. At operation 622, the API 120 or the application 110 sends a third request to the location engine 130 that the location-based information is not to be provided according to the second irregular periodic reporting pattern. The third request may include information related to the third performance requirement. At operation 624, the API 120 or the application 110 receives updates, e.g., from the location engine 130, on the location-based information according to the third irregular periodic reporting pattern in response to sending the third request.

Figure 7:
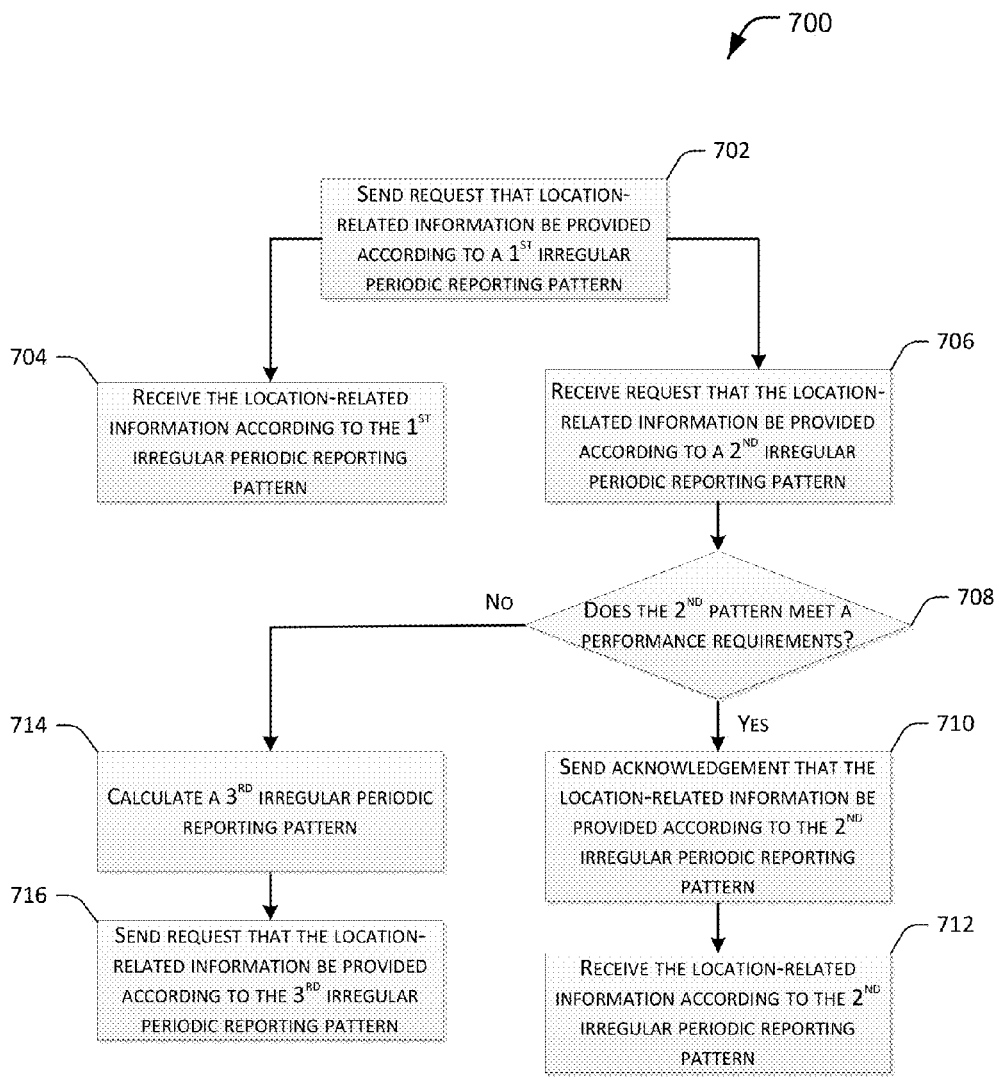
FIG. 7 is a flow chart illustrating still another example method of irregular periodic reporting of location-related information in accordance with the present disclosure.

FIG. 7 illustrates the example process 700 for irregular periodic reporting of location-related information. The process 700 is performed, at least in part, by the API 120 or the application 110, or partially by the API 120 and partially by the application 110.

The process 700 begins with operation 702, where the API 120 or the application 110 sends the location engine 130 a first request that location-related information be provided according to a first irregular periodic reporting pattern. At operation 704, in response to sending the first request, the API 120 or the application 110 receives, form the location engine 130, updates on the location-related information according to the first irregular periodic reporting pattern. Alternatively, at operation 706, the API 120 or the application 110 receives, from the location engine 130, a request that the location-related information be provided according to a second irregular periodic reporting pattern that is different from the first irregular periodic reporting pattern. The API 120 or the application 110 may additionally determine a first performance requirement and calculate the first irregular periodic reporting pattern based on the first performance requirement.

At operation 708, the API 120 or the application 110 determines whether the first performance requirement will be met when receiving the location-related information according to the second irregular periodic reporting pattern. At operation 710, in an event that it is determined the first performance requirement will be met, the API 120 or the application 110 sends an acknowledgement to the location engine 130. At operation 712, in response the API 120 or the application 110 receives, from the location engine 130, updates on the location-based information according to the second irregular periodic reporting pattern. At operation 714, in an event that it is determined the first performance requirement will not be met, the API 120 or the application 110 calculates a third irregular periodic reporting pattern that is different from the first and second irregular periodic reporting patterns. At operation 716, the API 120 or the application 110 sends, to the location engine 130, a second request that the location-based information be provided according to the third irregular periodic reporting pattern. Before sending the second request, the API 120 or the application 110 may calculate a second performance requirement that is different from the first performance requirement such that the second performance requirement will be met when receiving the location-related information according to the second irregular periodic reporting pattern.

Example Computing Device

Figure 8:
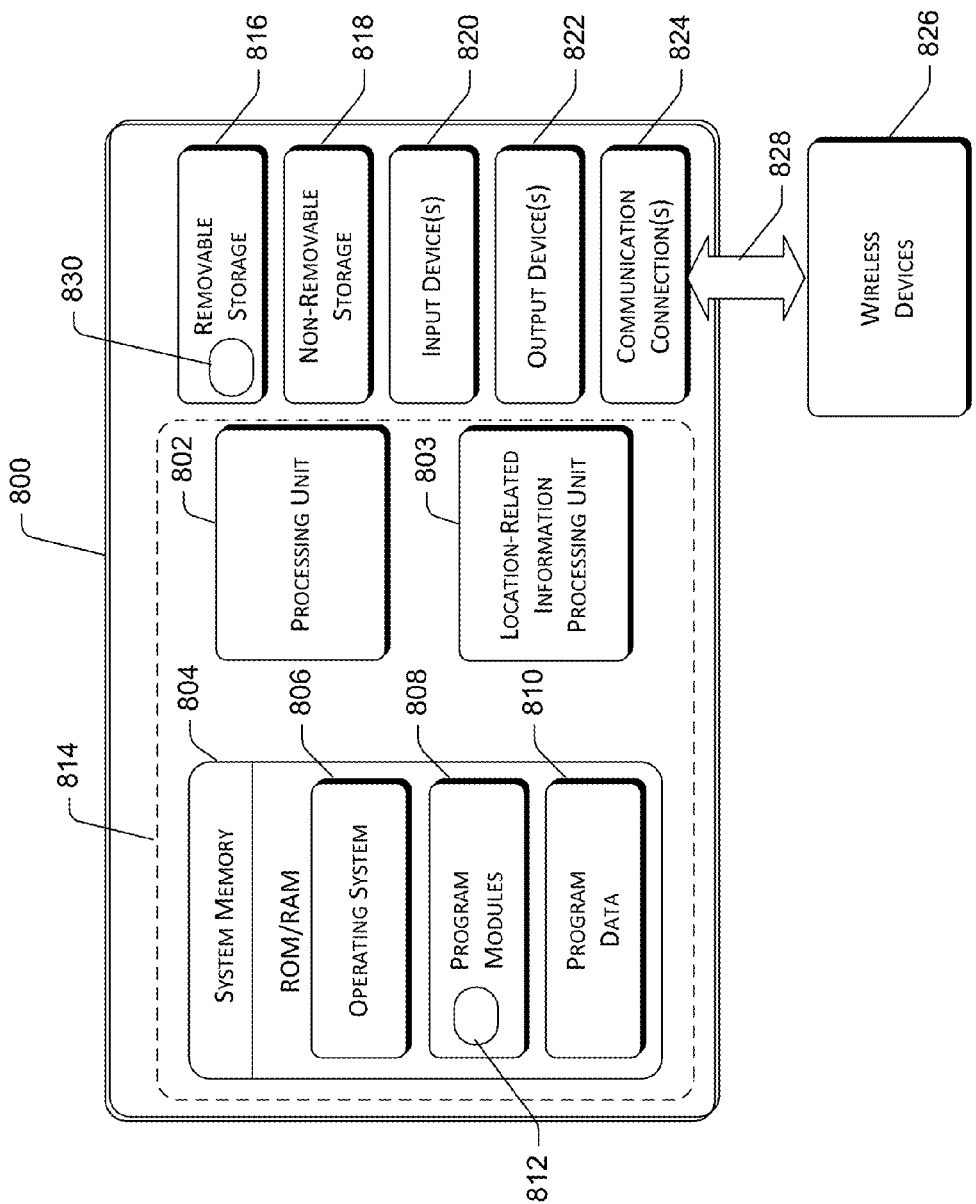
FIG. 8 is a block diagram illustrating an example computing device that implements techniques of irregular periodic reporting of location-related information in accordance with the present disclosure.

FIG. 8 illustrates an example computing device 800 that implements the techniques of irregular periodic reporting of location-related information. However, it will be readily appreciated that the techniques disclosed herein may be implemented in other computing devices, systems, and environments. The computing device 800 shown in FIG. 8 is one example of a computing device and is not intended to suggest any limitation as to the scope of use or functionality of the computer and network architectures.

In at least one implementation, computing device 800 typically includes at least one processing unit 802 and system memory 804. Depending on the exact configuration and type of computing device, system memory 804 may be volatile (such as RAM), non-volatile (such as ROM, flash memory, etc.) or some combination thereof System memory 804 may include an operating system 806, one or more program modules 808, and may include program data 810. A basic implementation of the computing device 800 is demarcated by a dashed line 814.

The program module 808 may include a module 812 that includes one or more sets of instructions that, when executed by the processing unit 812, cause the processing unit 802 to implement the techniques of irregular periodic reporting of location-related information as described above. For example, the module 802 may include instructions based on which the processing unit 802 can carry out one or more of the scheme 300, method 400, method 500, method 600 and method 700, and variations thereof, e.g., the computing device 800 acting as described above with respect to the mobile device 105. In other words, by executing the instructions stored in the module 802, the processing unit 812 can execute functions of one or more of the application 110, the API 120 and the location engine 130.

Optionally, computing device 800 may additionally include a location-related information processing unit 803 that is configured to execute operations to carry out functions of the location engine 130 as described above. In some embodiments, the location engine 130 is implemented in the location-related information processing unit 803. In some embodiments, both the processing unit 802 and the location-related information processing unit 803 are integral parts of a single integrated circuit (IC) chip.

Computing device 800 may have additional features or functionality. For example, computing device 800 may also include additional data storage devices such as removable storage 816 and non-removable storage 818. In certain implementations, the removable storage 816 and non-removable storage 818 are an example of computer accessible media for storing instructions that are executable by the processing unit 802 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., mobile device 105. Any of such computer accessible media may be part of the computing device 800.

In one implementation, the removable storage 816, which is a computer accessible medium, has a set of instructions 830 stored thereon. When executed by the processing unit 802, the set of instructions 830 cause the processing unit 802 to execute operations, tasks, functions and/or methods as described above, including scheme 300, method 400, method 500, method 600 and method 700, and variations thereof. In other words, by executing the instructions stored in the removable storage 816, the processing unit 812 can execute functions of one or more of the application 110, the API 120 and the location engine 130.

Computing device 800 may also include one or more input devices 820 such as keyboard, mouse, pen, voice input device, touch input device, etc. Computing device 800 may additionally include one or more output devices 822 such as a display, speakers, printer, etc.

Computing device 800 may also include one or more communication connections 824 that allow the computing device 800 to communicate wirelessly with one or more other wireless devices, over wireless connection 828 based on near field communication (NFC), Wi-Fi, Bluetooth, radio frequency (RF), infrared, or a combination thereof.

It is appreciated that the illustrated computing device 800 is one example of a suitable device and is not intended to suggest any limitation as to the scope of use or functionality of the various embodiments described.

Additional and Alternative Implementation Notes

In the above description of example implementations, for purposes of explanation, specific numbers, materials configurations, and other details are set forth in order to better explain the present disclosure, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" and "computer accessible media" include computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed is:

1. A method of implementing an irregular periodic reporting of location-related information by a device, the method comprising:
   receiving a first request that the location-related information be provided according to a first irregular periodic reporting pattern, the first irregular periodic reporting pattern having non-constant intervals between adjacent instances of reporting of location-related information; and
   in response to receiving the first request, providing updates on the location-related information according to the first irregular periodic reporting pattern or a second request that the location-related information be provided according to a second irregular periodic reporting pattern that is different from the first irregular periodic reporting pattern.

2. A method as recited in claim 1, wherein the location based information includes longitudinal and latitudinal information, information about a relation between a first location and a second location, or a combination thereof.

3. A method as recited in claim 1 further comprising:
   detecting a change in a first performance requirement that is met when updates on the location-related information are provided according to the first irregular periodic reporting pattern;
   calculating the second irregular periodic reporting pattern; and
   sending the second request that the location-related information be provided according to the second irregular periodic reporting pattern.

4. A method as recited in claim 3 further comprising:
   receiving an acknowledgement that the location-based information be provided according to the second irregular periodic reporting pattern; and
   providing updates on the location-based information according to the second irregular periodic reporting pattern in response to receiving the acknowledgement.

5. A method as recited in claim 1 further comprising:
   determining whether a first performance requirement will be met when providing the location-related information according to the first irregular periodic reporting pattern, wherein:
   updates on the location-related information are provided according to the first irregular periodic reporting pattern in an event that the first performance requirement will be met, and the second request is sent in an event that the first performance requirement will not be met.

6. A method as recited in claim 5, wherein the first performance requirement is related to power consumption, accuracy, time to first fix, or a combination thereof.

7. A method as recited in claim 5 further comprising:
determining the first performance requirement, wherein the first performance requirement is related to power consumption, accuracy, time to first fix, or a combination thereof.

8. A computing device comprising:
memory configured to store a set of instructions therein;
a processing unit coupled to the memory and, upon executing the set of instructions, configured to carry out operations, comprising:
sending a first request that location-related information be provided according to a first irregular periodic reporting pattern, the first irregular periodic reporting pattern having non-constant intervals between adjacent instances of reporting of location-related information; and
in response to sending the first request, receiving updates on the location-related information according to the first irregular periodic reporting pattern or a request that the location-related information be provided according to a second irregular periodic reporting pattern that is different from the first irregular periodic reporting pattern.

9. A computing device as recited in claim 8, wherein the location based information includes longitudinal and latitudinal information, information about a relation between a first location and a second location, or a combination thereof.

10. A computing device as recited in claim 8, wherein the processor is further configured to carry out operations comprising:
determining a first performance requirement; and
calculating the first irregular periodic reporting pattern based on the first performance requirement.

11. A computing device as recited in claim 10, wherein the first performance requirement is related to power consumption, accuracy, time to first fix, or a combination thereof.

12. A computing device as recited in claim 8, wherein the processor is further configured to carry out operations comprising:
determining whether a first performance requirement will be met when receiving the location-related information according to the second irregular periodic reporting pattern.

in an event that the first performance requirement will be met, sending an acknowledgement that the location-based information be provided according to the second irregular periodic reporting pattern; and
receiving updates on the location-based information according to the second irregular periodic reporting pattern in response to sending the acknowledgement.

13. A computing device as recited in claim 12, wherein the processor is further configured to carry out operations comprising:
in an event that the first performance requirement will not be met, calculating a third irregular periodic reporting pattern that is different from the first and second irregular periodic reporting patterns; and
sending a second request that the location-based information be provided according to the third irregular periodic reporting pattern.

14. A computing device as recited in claim 12, wherein the processor is further configured to carry out operations comprising:
in an event that the first performance requirement will not be met, calculating a second performance requirement that is different from the first performance requirement;
calculating a third irregular periodic reporting pattern based on the second performance requirement, the third irregular periodic reporting pattern different from the first and second irregular periodic reporting patterns; and
sending a second request that the location-based information be provided according to the third irregular periodic reporting pattern.

15. A computing device as recited in claim 12, wherein the processor is further configured to carry out operations comprising:
in an event that the first performance requirement will not be met, calculating a second performance requirement that is different from the first performance requirement such that the second performance requirement will be met when receiving the location-related information according to the second irregular periodic reporting pattern; and
sending a second request that the location-based information be provided according to the second irregular periodic reporting pattern.

* * * * *